United States Patent [19]

Dietz

[11] E Re. 30,271

[45] Reissued May 6, 1980

[54] SIDE PINCUSHION CORRECTION SYSTEM

[75] Inventor: Wolfgang F. W. Dietz, New Hope, Pa.

[73] Assignee: RCA Corporation, New York, N.Y.

[21] Appl. No.: 897,299

[22] Filed: Apr. 17, 1978

Related U.S. Patent Documents

Reissue of:

[64] Patent No.: 3,962,602
Issued: Jun. 8, 1976
Appl. No.: 510,096
Filed: Sep. 27, 1974

[51] Int. Cl.[2] ..... H01J 29/70

[52] U.S. Cl. ..... 315/370; 315/371; 315/403

[58] Field of Search ..... 315/370, 371, 403, 406

[56] References Cited

U.S. PATENT DOCUMENTS

| | | | |
|---|---|---|---|
| 3,648,099 | 3/1972 | Otten et al. | 315/371 |
| 3,668,463 | 6/1972 | Smith et al. | 315/370 |

*Primary Examiner*—Maynard R. Wilbur
*Assistant Examiner*—Richard E. Berger
*Attorney, Agent, or Firm*—Eugene M. Whitacre; Paul J. Rasmussen; William H. Meise

[57] ABSTRACT

A series coupled inductance and active current conducting device are coupled in parallel with a winding of an output transformer of a horizontal deflection generator. Flyback pulses integrated in sawtooth waveforms are combined with a vertical rate parabolic waveform derived from a vertical deflection generator and coupled to a control electrode of the active device for controlling its conduction during each flyback interval at a vertical rate for loading the output transformer and thereby altering the horizontal scanning current in a manner to correct for side pincushion distortion.

31 Claims, 2 Drawing Figures

SIDE PINCUSHION CORRECTION SYSTEM

Matter enclosed in heavy brackets [ ] appears in the original patent but forms no part of this reissue specification; matter printed in italics indicates the additions made by reissue.

BACKGROUND OF THE INVENTION

This invention relates to a side pincushion correction circuit for use in display systems such as television systems.

It is well recognized that the geometrical relationship of the scanning beam or beams of a cathode ray tube to the inside surface of the viewing screen over which they are scanned causes a raster distortion known as pincushion distortion. This distortion is characterized by a widening of the display in a horizontal direction at the top and bottom of the raster relative to the center of the raster. It is also well recognized that in many situations this distortion can be corrected by modulating the horizontal scanning current at the vertical deflection scanning rate. Frequently the modulation is in parabolic form, causing a maximum decrease in horizontal scanning current at the top and bottom of the raster, corresponding to the beginning and end portions of the vertical trace interval, relative to the horizontal scanning current at the center of the raster.

The vertical rate modulation may be impressed upon the horizontal scanning current in a number of ways. A reactor may be placed in circuit with the horizontal deflection coils and controlled to vary the impedance to horizontal scanning current at the vertical rate. A transformer in circuit with the horizontal deflection coils may also be utilized to achieve the required modulation. A more recent approach is to rectify horizontal rate energy, such as that obtained from a winding of the horizontal output transformer, and utilize the rectified current for supplying the vertical deflection output stage. The vertical stage itself then loads the horizontal winding such that the horizontal scanning current is modulated at the vertical deflection rate. While this arrangement is satisfactory, it would be desirable to provide a raster correction circuit which offers a greater degree of control over the modulation.

SUMMARY OF THE INVENTION

In accordance with the invention, a side pincushion correction system is provided including a line rate deflection generator coupled to a line deflection winding and a first winding of an output transformer for inducing energy therein for defining trace and retrace intervals during each line deflection cycle. An inductance and an active current conducting device are serially coupled between a terminal of a second winding of said transformer and a point of reference potential. First waveshaping means are coupled to a winding of said transformer and a control electrode of said device for enabling conduction of said device during said retrace intervals. Second waveshaping means are coupled to a field rate generator and said control electrode for modulating the conduction of said device at said field rate to load said first winding and alter the scanning current in said line deflection winding in a manner to correct for side pincushion distortion.

A more detailed description of the invention is given in the following specification and accompanying drawing of which:

FIGS. 1 and 2 are circuit diagrams of first and second pincushion correction systems embodying the invention.

DETAILED DESCRIPTION OF THE INVENTION

Figure 1:
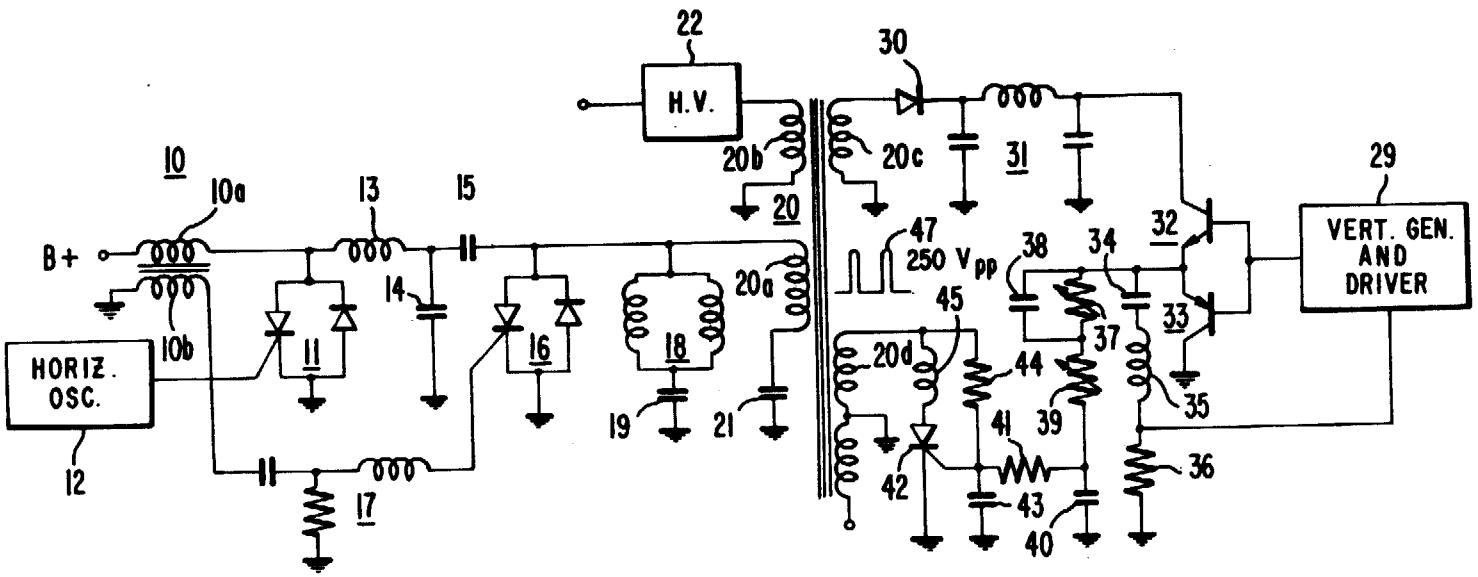

In FIG. 1, a winding 10a of an input reactance 10 is coupled between a source of voltage B+ and one terminal of a bidirectionally conducting switch 11. Winding 10a is also coupled to a commutating coil 13 and a capacitor 15 to one terminal of a second bidirectionally conducting switch 16. An auxiliary capacitor 14 is coupled between commutating coil 13 and capacitor 15 and ground. Switch 16 is also coupled through horizontal deflection windings 18 and S-shaping capacitor 19 to ground and through a primary winding 20a of a horizontal output transformer 20 and a blocking capacitor 21 to ground. A horizontal oscillator 12 is coupled to the gate electrode of one of the elements of switch 11. A winding 10b of input reactor 10 is coupled through a waveshaping network 17 to provide gating signals for one element of switch 16. The circuit described thus far is a horizontal deflection circuit of the retrace driven SCR type described in U.S. Pat. No. 3,452,244. Since a description of the operation of this circuit is unnecessary for an understanding of the invention, it will suffice to say that the horizontal deflection circuit induces a scanning current through the horizontal deflection coils 18 and induces horizontal rate energy into the primary winding 20a of the horizontal output transformer 20. The horizontal energy comprises a relatively short retrace portion and a trace interval portion. Switch 16 connects deflection windings 18 across current source 19 and winding 20a across source 21 during the scan interval. Switch 11 connects elements 13, 14 and 15 to receive energy from winding 10a during the commutation interval, which includes the retrace interval, to receive energy to transfer this energy to capacitors 19 and 21 to replace losses during said deflection cycle.

A winding 20b of horizontal output transformer 20 supplies horizontal retrace pulses to a conventional high voltage rectifier and multiplier 22 for producing a positive high voltage in the order of 25,000 volts for energizing the ultor terminal of a television picture tube.

The remainder of the circuit in FIG. 1 includes the circuit embodying the invention for providing pincushion distortion correction to the horizontal scanning current.

A secondary winding 20c of output transformer 20 is coupled to a rectifier 30 and filter network 31 for rectifying the horizontal retrace pulses and providing a source of direct current. Filter network 31 is coupled through series connected transistors 32 and 33 to ground. Transistors 32 and 33 provide a complementary symmetry push-pull output stage for the vertical deflection circuit. A vertical generator and driver stage 29 provides sawtooth drive signals at the vertical deflection rate for causing transistors 32 and 33 to conduct. The common junction of the emitter electrodes of transistors 32 and 33 forms an output terminal which is coupled through a coupling capacitor 34 to a vertical deflection winding 35. The other terminal of vertical deflection winding 35 is coupled through a feedback resistor 36 to ground. An AC feedback signal is taken from the top of resistor 36 and fed back to the vertical generator and driver 29 for linearity correction. The vertical stage described thus far is conventional and any suitable push-pull vertical amplifier may be utilized for the purpose of providing vertical scanning current and for the purpose of providing appropriate vertical signals for use with the remainder of the pincushion correction circuitry.

The output terminal of the vertical deflection stage is coupled through the parallel combination of a variable resistor 37 and a capacitor 38 through an amplitude potentiometer 39 and through an integrating capacitor 40 to ground. As can be seen more clearly in FIG. 2, the waveform obtained at the output terminal of the vertical deflection amplifier is essentially a sawtooth waveform. Variable resistor 37 passes a DC component of this waveform and serves as a width control for the pincushion correction circuitry, as will be explained subsequently. Capacitor 40 integrates the sawtooth waveforms to form essentially parabolic waveforms at the vertical deflection rate. These parabolic waveforms are coupled through a resistor 41 to the gate electrode of an SCR 42. The main conduction path of SCR 42 is coupled in series with an inductance 45 and this combination is coupled in parallel with a winding 20d of horizontal output transformer 20.

The number of turns of winding 20d is selected to provide a retrace pulse 47 having an amplitude of about 250 volts peak-to-peak, as shown. The positive-going horizontal retrace pulses provide the anode voltage for SCR 42. A series coupled resistor 44 and integrating capacitor 43 are coupled in parallel with SCR 42 and inductance 45. The junction of resistor 44 and capacitor 43 is coupled to the gate electrode of SCR 42. Resistor 44 and capacitor 43 serve to integrate the horizontal retrace pulses to form substantially sawtooth pulses applied to the gate electrode of SCR 42. It is noted that the horizontal rate sawtooth pulses and the vertical rate parabola are combined at the gate electrode. The positive-going vertical rate parabola modulates the horizontal rate sawtooth pulses such that SCR 42 conducts more at the beginning and ends of the parabola, corresponding to the top and bottom portions of the raster, than at the center. When SCR 42 is conducting, it couples inductor 45 in parallel with horizontal winding 20d and loads this winding by diverting current through inductor 45 to ground. The loading of horizontal winding 20d is reflected to the primary winding 20a. This loading decreases the total inductance in the circuit and results in a faster discharge of capacitors 14 and 15 during the horizontal retrace interval. This faster discharge of these capacitors reduces the stored energy in primary winding 20a and thereby reduces the energy available for transfer to deflection winding 18, which in turn reduces the width of the raster.

Figure 2:
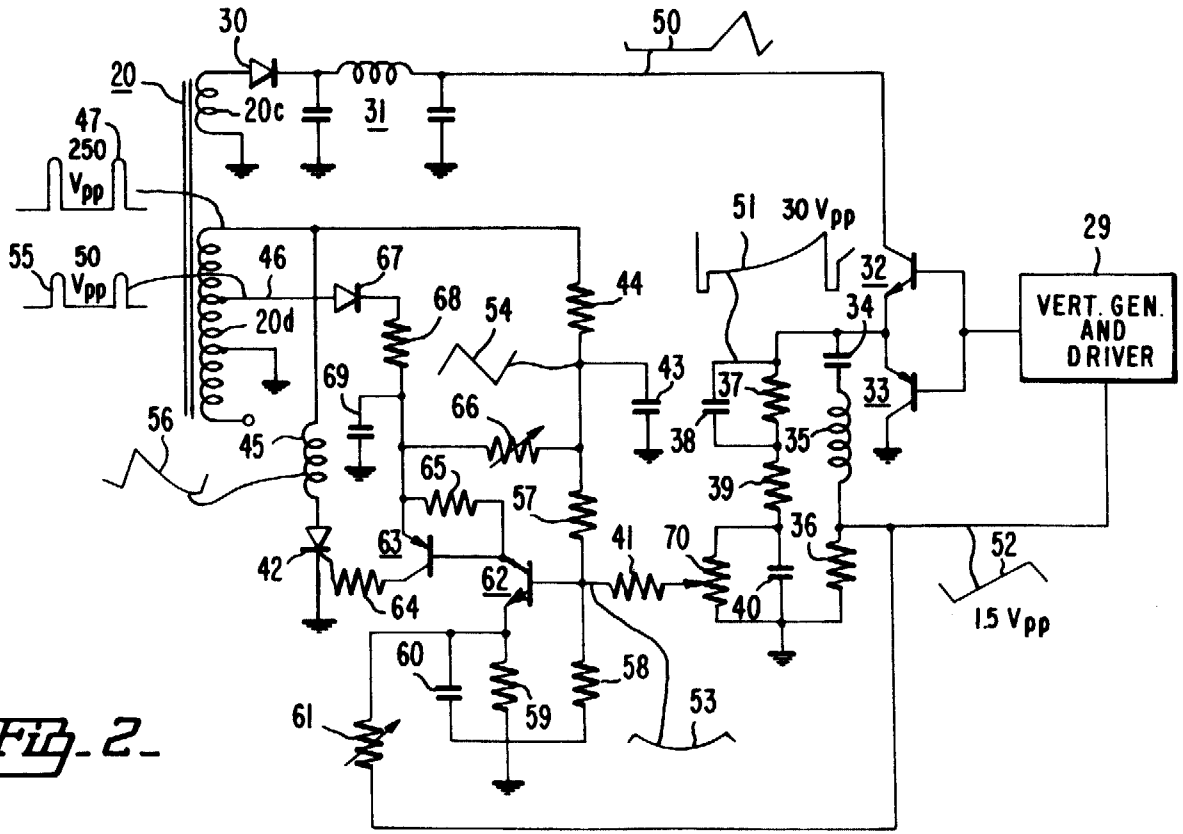

As this loading occurs during each horizontal deflection cycle modulated in a parabolic manner at a vertical rate as described above, side pincushion correction is thereby achieved. The DC potential at the gate electrode of SCR 42 is determined by the setting of potentiometer 37. This DC potential further biases the gate electrode of SCR 42 to control its conduction during the horizontal retrace interval to alter the amount of current loading and thereby alter the width of the raster. In FIG. 2, another embodiment of the side pincushion distortion correction circuit in accordance with the invention is illustrated. It is noted that the horizontal deflection circuitry to the left of horizontal transformer 20 is omitted, as it may be the same as illustrated in FIG. 1. Those components in FIG. 2 performing the same function as in FIG. 1 are labelled with the same reference numerals as in FIG. 1.

The substantially sawtooth waveform 51 obtained from the output terminal of the vertical deflection output stage is coupled through the parallel combination of resistor 37 and capacitor 38 and through a resistor 39 to an integrating capacitor 40. A potentiometer in parallel with capacitor 40 serves as an amplitude control. The wiper arm of potentiometer 70 is coupled through a resistor 41 to the base electrode of a transistor 62. A vertical rate parabolic waveform 53 is shown at the base electrode of transistor 62. Transistors 62 and 63 serve as a driving stage for the gate electrode of SCR 42. The emitter electrode of transistor 62 is coupled through the parallel combination of a resistor 59 and bypass capacitor 60 to ground. The collector electrode of transistor 62 is coupled to the base of transistor 63 and through a resistor 65 to the emitter electrode of transistor 63. The collector electrode of transistor 63 is coupled through a resistor 64 to provide the drive current for the gate electrode of SCR 42. A tap 46 on winding 20d of horizontal output transformer 20 is coupled to a rectifier diode 67. Horizontal rate retrace pulses 55 having an amplitude of approximately 50 volts peak-to-peak are rectified by diode 67 and coupled through a resistor 68 to a filter capacitor 69, the other terminal of which is coupled to ground. Direct current is obtained from the junction of resistor 68 and capacitor 69. This direct current is coupled to the emitter of transistor 63 to provide operating current thereto and through resistor 65 to the junction of the base of transistor 63 and the collector of transistor 62. The junction of resistor 68 and capacitor 69 is further coupled through a potentiometer 66, which acts as a width control, and through serially coupled resistors 57 and 58 to ground. The junction of resistors 57 and 58 is coupled to the base electrode of transistor 62 to provide direct current bias thereto. Adjustment of potentiometer 66 varies the amount of DC bias applied to the base of transistor 62.

The top terminal of winding 20d, from which horizontal retrace pulses having an amplitude of approximately 250 volts peak-to-peak are obtained, is coupled through a resistor 44 and an integrating capacitor 43 to ground. At the junction of resistor 44 and capacitor 43, horizontal rate sawtooth pulses 54 are obtained. It is noted that the positive peak of the sawtooth waveforms 54 occurs during the horizontal retrace interval. The sawtooth waveforms 54 are coupled through resistor 57 to the base of transistor 62, which amplifies and inverts the waveforms which are then coupled to the base of transistor 63 for further amplification and another inversion, to provide positive-going sawtooth waveforms coupled through resistor 64 to the gate electrode of SCR 42.

It is noted that the vertical rate parabolic waveform 53 is combined with the horizontal rate sawtooth waveforms 54 at the base electrode of transistor 62. Thus, the total waveform coupled through transistors 62 and 63 and applied to the gate electrode of SCR 42 comprises the horizontal rate sawtooth waveforms riding on top of the vertical rate parabolic waveforms. A further component of this combined waveform is the direct current component determined by the setting of width control 66. This combined signal causes SCR 42 to conduct during the latter half of each horizontal deflection cycle. The conduction is greatest at the beginning and end of each vertical deflection cycle because the parabolic waveform 53 is most positive at these portions. The conduction time of SCR 42 is decreased toward the center of the vertical rate parabola 53.

The junction of vertical deflection winding 35 and feedback resistor 36, at which a vertical rate sawtooth waveform 52 is obtained, is coupled through a potentiometer 61 to the emitter electrode of transistor 62. This sawtooth waveform modulates the combined horizontal rate sawtooth and vertical rate parabolic waveforms in a manner to vary the amplitude at the beginning of the vertical parabola relative to the amplitude at the end of the vertical parabolic waveform. This adjustment as determined by resistor 61 serves to adjust the tilt of the raster by adjusting the width of the raster at the top relative to the bottom.

As in FIG. 1, conduction of SCR 42 couples inductance 45 to ground, placing a shunt load on horizontal winding 20d. The current in inductance 45 is illustrated by current waveform 56. The current builds up in a positive manner to reach a peak at the end of the retrace period and when SCR 42 is cut off, the current decreases and reverses itself through inductance 45 returning energy to deflection winding 46 primarily during the first portion of each horizontal scan interval following each retrace interval. The loading of winding 20d by inductance 45 and conducting SCR 42 is reflected to the primary circuit of the horizontal deflection transformer and thereby alters the deflection current in the horizontal deflection winding during the latter half of the horizontal retrace interval at a vertical parabolic rate such that the raster width is reduced at the top and bottom relative to the center of the raster. This corrects for the pincushion distortion.

It is noted that in accordance with a feature of the invention the inductive loading of the horizontal winding 20d by inductance 45 causes the loading to occur during the second half of each retrace interval. This results in minimum effect caused by modulation of the picture tube high voltage derived by rectifying the horizontal retrace pulses because most of the high voltage energy is obtained from the winding 20d during the middle portion of each horizontal retrace interval as the retrace pulse reaches its peak voltage and the capacitance in the multiplier and rectifier assembly 22 charges to the peak voltage.

What is claimed is:

1. A side pincushion correction circuit comprising:

a line output transformer;

a line deflection winding;

a line deflection generator coupled to said deflection winding and to a first winding of said transformer for inducing energy therein for defining trace and retrace intervals during each line deflection cycle;

a series coupled inductance and active current conducting device coupled in parallel with a second winding of said line transformer;

first waveshaping means coupled to a winding of said transformer for shaping retrace interval waveforms obtained from said winding;

a field rate deflection generator;

second waveshaping means coupled to said field rate generator; and means for combining said line and field rate waveforms obtained from said first and second waveshaping means and for coupling them to a control electrode of said active current conducting device to conduct for different durations during the line retrace intervals at the field rate for loading said transformer and thereby altering the current in said line rate deflection winding in a manner to compensate for side pincushion distortion.

2. A side pincushion correction circuit according to claim 1 wherein said second winding provides operating voltage for said active device.

3. A side pincushion correction circuit according to claim 2 wherein said first waveshaping means integrates said retrace interval waveforms for forming substantially sawtooth waveforms.

4. A side pincushion correction circuit according to claim 3 wherein said second waveshaping means integrates waveforms obtained from said field rate generator for forming substantially parabolic field rate waveforms for combining with said sawtooth line rate waveforms.

5. A side pincushion correction circuit according to claim 4 wherein said active current conducting device is a thyristor.

6. A side pincushion correction circuit according to claim 5 wherein said field rate deflection generator includes a push-pull output stage obtaining its operating current from rectifying means coupled to a third winding of said line rate output transformer such that said field rate generator additionally loads said line rate scanning current at a field rate in a manner to compensate for side pincushion distortion.

7. A side pincushion distortion correction system comprising:

a horizontal deflection generator of the retrace driven type including first and second bidirectional conducting switches, said second switch being coupled to a deflection winding and a winding of an output transformer and said generator supplying energy for said deflection winding during a first interval of each deflection cycle, said first interval including the retrace interval;

a series coupled inductance and active current conducting device direct current coupled in that order between a terminal of a second winding of said transformer and a point of reference potential, retrace pulse energy obtained from said winding supplying operating current to said active device;

first waveshaping means coupled to said second winding and to a control electrode of said active device for enabling conduction of said device during the last portion of said horizontal retrace intervals; and second waveshaping means coupled to said control electrode for providing a substantially parabolic vertical deflection rate waveform for controlling the conduction time of said active device during said horizontal retrace intervals at said vertical rate such that said first and second transformer windings are loaded by conduction of said active device and scanning current in said deflection winding is altered in a manner to correct for said side pincushion distortion.

*8. A television kinescope deflection apparatus comprising:*

*a vertical deflection generator coupled to a vertical deflection coil for producing vertical scanning current therethrough;*

*a horizontal deflection generator system for generating horizontal rate current;*

*a horizontal deflection winding coupled to said horizontal deflection generator for accepting horizontal rate current therefrom for scanning;*

*impedance means;*

*controllable switch means;*

*first coupling means for coupling said impedance means and said controllable switch means in circuit with said deflection winding for defining a path therewith for said horizontal rate current; and*

*control means coupled to said vertical and to said horizontal deflection generator systems and to said controllable switch means for operating said controllable switch means for controlling its conduction during each flyback interval at a vertical rate for altering the horizontal scanning current in a manner to correct side pincushion distortion.*

*9. A television kinescope deflection apparatus according to claim 8 wherein said impedance means comprises inductance means.*

*10. A television kinescope deflection apparatus according to claim 8 wherein:*

*said first coupling means couples said impedance means in shunt with said deflection winding; and*

*said control means operates said controllable switch means for durations during the horizontal retrace interval which are varied in a manner for altering said scanning current in a manner to reduce pincushion distortion.*

*11. A television kinescope deflection apparatus according to claim 10 wherein said impedance means comprises inductance means and said control means operates said controllable switch means by horizontal rate signals combined with vertical rate parabolic signals.*

*12. A television kinescope deflection apparatus according to claim 8 wherein said controllable switch means comprises an active current conducting device having a controllable main conduction path and also having a control electrode.*

*13. A television kinescope deflection apparatus according to claim 12 wherein said active current conducting device is an SCR.*

*14. A television kinescope deflection apparatus according to claim 12 wherein said controllable main conduction path of said active current conducting device is serially coupled with said impedance means.*

*15. A television kinescope deflection apparatus according to claim 14 wherein said serially coupled impedance means and said main conduction path of said active current conducting device are coupled by said first coupling means in parallel with said horizontal deflection winding.*

*16. A television kinescope deflection apparatus according to claim 15 wherein said first coupling means comprises transformer means.*

*17. A television kinescope deflection apparatus according to claim 16 wherein said transformer means includes a first winding coupled to said horizontal deflection winding and a second winding coupled to said serially coupled impedance means and active current conducting device main conduction path.*

*18. A television kinescope deflection apparatus according to claim 16 wherein said transformer means includes a first winding coupled in parallel with said horizontal deflection winding and a second winding coupled across said serial combination of said impedance means and said main conduction path of said active current controlling means.*

*19. A television kinescope deflection apparatus according to claim 8 wherein said control means operates said controllable switch means during the second half of each retrace interval.*

*20. A television kinescope deflection apparatus according to claim 8 wherein said control means varies the conduction time of said controllable switch means during the horizontal retrace interval at the vertical rate.*

*21. A television kinescope deflection apparatus according to claim 20 wherein said impedance means is coupled in serial combination with said controllable switch means, and said serial combination is coupled in parallel with said horizontal deflection winding.*

*22. A television kinescope deflection apparatus according to claim 8 wherein said control means comprises:*

*parabola waveshaping means coupled to the vertical deflection generator for generating a parabolic signal at the vertical deflection rate;*

*horizontal rate waveshaping means coupled to said horizontal deflection generator system for generating a horizontal rate signal having a maximum during said horizontal retrace pulse period; and*

*modulating means coupled to said parabola waveshaping means and to said horizontal rate waveshaping means for generating horizontal rate pulses modulated by said parabola signal.*

*23. A television kinescope deflection apparatus comprising:*

*a vertical deflection generator coupled to a vertical deflection coil for producing vertical scanning current therethrough;*

*a horizontal deflection generator system for generating horizontal rate current;*

*a horizontal deflection winding coupled to said horizontal deflection generator for accepting horizontal rate current therefrom for scanning;*

*impedance means;*

*controllable switch means;*

*means coupling said impedance means and said controllable switch means in circuit with said deflection winding for defining a path for said horizontal rate current;*

*control means coupled to said vertical and to said horizontal deflection generator systems and to said controllable switch means for operating said controllable switch means at a time during the horizontal retrace interval which is progressively advanced during the first half of the vertical scan interval and which is progressively retarded during the second half of the vertical scan interval for altering said scanning current in a manner to reduce pincushion distortion.*

*24. A television kinescope deflection apparatus according to claim 23 wherein said impedance means is coupled in shunt with said horizontal deflection winding.*

*25. A television kinescope deflection apparatus according to claim 23 wherein said impedance means is serially coupled with said controllable switch means.*

*26. A television kinescope deflection apparatus according to claim 25 wherein said impedance means and serially coupled controllable switch means are coupled in shunt with said horizontal deflection winding.*

*27. A pincushion correction circuit for a kinescope deflection apparatus including horizontal and vertical deflection generator systems, comprising:*

*a horizontal deflection winding coupled to the horizontal deflection generator system for accepting scanning current therefrom;*

*an impedance circuit including an inductor;*

*first coupling means for coupling said impedance circuit with said deflection winding;*

*controllable switch means including a control electrode and a controlled current path serially coupled with said impedance circuit; and*

*control means coupled to the horizontal and vertical deflection generator and to said control electrode for operating said controllable switch means at a time during the second half of the horizontal retrace interval which time is progressively advanced during a first portion of the vertical scan interval and which is progressively retarded during a second portion of the vertical scan interval for altering said scanning current in a manner to reduce pincushion distortion.*

*28. A pincushion correction circuit according to claim 27 wherein said first coupling means couples said impedance circuit in parallel with said deflection winding.*

*29. A pincushion correction circuit according to claim 28 wherein said first coupling means comprises;*

*transformer means having a primary winding and a secondary winding; and*

*wherein said primary winding is coupled with said deflection winding and said secondary winding is coupled with said impedance circuit.*

*30. A pincushion correction circuit according to claim 27 wherein said controllable switch means comprises an SCR.*

*31. A pincushion correction circuit according to claim 30 wherein said controlled current path of said uncontrollable switch comprises the anode-to-cathode conducting path of said SCR; and*

*said control electrode of said controllable switch means comprises the gate of said SCR.*

* * * * *